United States Patent
Sugahara et al.

(10) Patent No.: US 6,804,673 B2
(45) Date of Patent: Oct. 12, 2004

(54) ACCESS ASSURANCE FOR REMOTE MEMORY ACCESS OVER NETWORK

(75) Inventors: Hirohide Sugahara, Kawasaki (JP); Jeffrey D. Larson, San Jose, CA (US); Takashi Miyoshi, San Jose, CA (US); Takeshi Horie, Palo Alto, CA (US)

(73) Assignee: Fujitsu Limited (JP)

( * ) Notice: Subject to any disclaimer, the term of this patent is extended or adjusted under 35 U.S.C. 154(b) by 269 days.

(21) Appl. No.: 09/839,954

(22) Filed: Apr. 19, 2001

(65) Prior Publication Data

US 2003/0009432 A1 Jan. 9, 2003

(51) Int. Cl.⁷ .......................... G06F 7/00; G06F 15/167
(52) U.S. Cl. ............................. 707/10; 707/2; 709/212
(58) Field of Search .............................. 707/10, 1, 8, 2; 709/212; 710/22–28, 308

(56) References Cited

U.S. PATENT DOCUMENTS

| | | | | |
|---|---|---|---|---|
| 5,717,952 A | * | 2/1998 | Christiansen et al. | 710/22 |
| 5,878,217 A | * | 3/1999 | Cherukuri | 709/212 |
| 5,922,046 A | * | 7/1999 | Thomas et al. | 709/212 |
| 5,941,969 A | * | 8/1999 | Ram et al. | 710/315 |
| 6,145,016 A | * | 11/2000 | Lai et al. | 710/4 |
| 6,170,025 B1 | | 1/2001 | Drottar et al. | |
| 6,205,508 B1 | | 3/2001 | Bailey et al. | |
| 6,216,193 B1 | * | 4/2001 | Lai et al. | 710/308 |
| 6,233,636 B1 | | 5/2001 | Kelley et al. | 710/126 |
| 6,360,220 B1 | * | 3/2002 | Forin | 707/8 |
| 6,487,619 B1 | * | 11/2002 | Takagi | 710/105 |
| 2002/0124127 A1 | * | 9/2002 | Dawkins et al. | 710/200 |
| 2002/0129272 A1 | * | 9/2002 | Terrell et al. | 713/201 |
| 2002/0191599 A1 | * | 12/2002 | Parthasarathy et al. | 370/389 |

OTHER PUBLICATIONS

Blumrich et al. "Protected, User–level DMA for the SHRIMP Network Interface." Proceedings of the Second International Symposium on High–Performance Computer Architecture, 1996. Pp. 154–165. Feb. 1996. IEEE Press.*
"Getting Started with the 21554 Embedded PCI–to–PCI Bridge," Intel Corporation, Application Note, 14 Pages, Order No.: 278210–001, Sep. 1998.
Intel Corporation, "Getting Started with the 21554 Embedded PCI–to–PCI Bridge," Application Note, 14 pages, Order No. 278210–001, Sep. 1998.

* cited by examiner

*Primary Examiner*—Uyen Le
*Assistant Examiner*—Brian Goddard
(74) *Attorney, Agent, or Firm*—Fenwick & West LLP

(57) ABSTRACT

A method and system provide access assurance regarding an RDMA transaction. The system comprises an initiating device and a target device placed across a network. The initiating device and the target device are coupled to a first and a second buses, respectively. The first and the second buses are coupled to the network router through a first and a second network adaptors. An RDMA space and an associated access assurance space are assigned to the target device in the memory space of the first bus. The initiating device may RDMA the target device by directly reading from or writing into the RDMA space assigned to the target device. To obtain access assurance information regarding the RDMA transaction, the initiator performs a read from the assurance space associated with the RDMA space of the target device in the memory space of the first bus.

13 Claims, 4 Drawing Sheets

ACCESS ASSURANCE FOR REMOTE MEMORY ACCESS OVER NETWORK

RELATED APPLICATIONS

The present application relates to the subject matter of U.S. application Ser. No. 09/705,451, filed by Hirohide Sugahara, et al. on Nov. 2, 2000, now U.S. Pat. No. 6,684,281.

FIELD OF THE INVENTION

The present invention relates generally to computer networking, and particularly to direct memory access over a computer network.

BACKGROUND OF THE INVENTION

As high-speed networks make it easier to use distributed resources, it becomes increasingly important to allow a device at one node of a computer network to directly access remote memories at other nodes of the computer network. By using Remote Direct Memory Access ("RDMA") for data transfer, processors in a computer network may exchange data directly between their respective user memories with a minimum of intervention from the operating system. This leads to a significant reduction in the startup latency, and higher throughput.

An RDMA operation is a direct exchange of data between the memory contents of two devices over a network. RDMA means that once a node (e.g., a server) allocates, pins down (making it non swappable) a bulk of memory and sends the memory description to another node (e.g., a client) the other node can read and write to that memory directly. Directly means that the central processing unit ("CPU") on the server or the client is not involved in the RDMA operation. With RDMA a client can manage the memory surrendered by a server as an alternative page file.

Accesses through a network always has possibilities of error. In order to make sure that a write access using RDMA is done properly, the device which performs the write access may have to perform a read access to read the written data. Also, in order to make sure that a read access using RDMA is done properly, the device which performs the read access may have to perform the read access again and compare the read data from the two read access. These methods for RDMA assurance are time consuming and waste network resources.

Therefore, there is a need for a system and a method that allows an initiator of an RDMA to obtain access assurance that the RDMA is done properly, and/or to obtain error information if an erroneous situation occurred during the RDMA process, without going through the aforementioned procedures.

SUMMARY OF THE INVENTION

The present invention comprises a method and system that provide access assurance regarding an RDMA transaction over a computer network.

In one embodiment of the present invention, a first device and a second device are coupled to first and second peripheral component interconnect ("PCI") buses, respectively. The first and the second PCI buses are coupled to the computer network through first and second PCI network adaptors, respectively. The first and second PCI network adaptors include functional units to facilitate a memory-mapped read or write on the first PCI bus to be bridged to the second PCI bus through the computer network. An RDMA space and an associated access assurance space are assigned to the second device in the memory space of the first PCI bus, to which the first device is coupled. The first device may RDMA the second device by directly reading from or writing into the RDMA space assigned to the second device. The first and second PCI network adaptors process the RDMA transaction. For each RDMA transaction initiated by the first device and targeted at the second device, the second PCI network adaptor also prepares access assurance information corresponding to the RDMA transaction and sends it to the first PCI network adaptor in a response packet. The access assurance information is stored in the first PCI network adaptor until it is checked by the first device. To obtain this access assurance information regarding the RDMA transaction, the first device performs a PCI read from the assurance space associated with the RDMA space assigned to the second device in the PCI memory space of the first PCI bus.

DETAILED DESCRIPTION OF THE INVENTION

Figure 1:
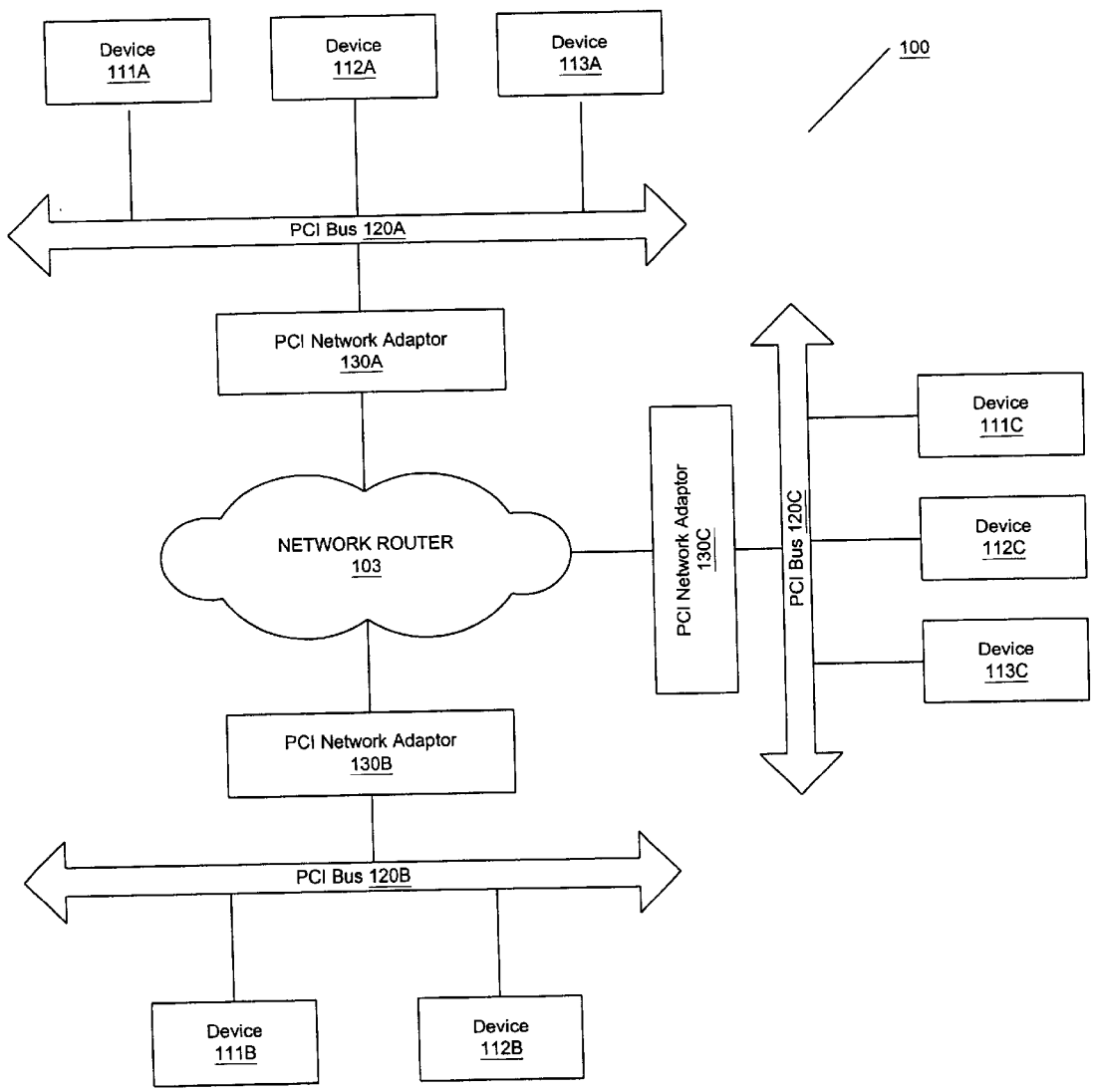
FIG. 1 is a block diagram of an overview of a computer network in accordance with one embodiment of the present invention.

FIG. 1 is a block diagram of a system 100 in accordance with an embodiment of the present invention. The system 100 is a computer network ("network") comprising a network router 103 and three nodes, nodes A–C, coupled to the network router 103. Node A includes one or more devices, e.g., 111A, 112A and 113A, which are coupled to a bus 120A. The bus 120A is coupled to the network router 103 through a network adaptor 130A. Node B includes one or more devices, e.g., 111B and 112B, which are coupled to a bus 120B. The bus 120B is coupled to the network router 103 through a network adaptor 130B. Node C includes one or more devices, e.g., 111C, 112C and 113C, which are coupled to a bus 120C. The bus 120C is coupled to the network router 103 through a network adaptor 130C.

Each device, e.g., 111A, 112A, 113A, 111B, 112B, 111C, 112C and 113C, in the system 100 is generally referred to as a device 110. The device 110 can be a conventional PCI device such as a display, a disk drive, a sound card or a small computer standard interface ("SCSI") adapter. The device 110 can also represent a conventional workstation or personal computer on a network, or it can represent an entire network. Alternatively, the device 110 can represent a specialized node. For example, the device 110 can be a data vault comprising a Direct Memory Access ("DMA") device or disk controller card coupled to one or more storage devices. Furthermore, the device 110 can represent an unintelligent node, such as an input/output ("IO") device. On the other hand, the device 110 can also represent an intelligent node that has a resident CPU or microcontroller unit of some kind. In short, the device 110 can be any one of a number of devices or node configurations. It is noted that each device 110 may alternatively be referred to as a peripheral or peripheral device.

Although two or three peripherals are shown to be coupled to each of the buses 120A–C, either fewer or more peripherals can be connected to any one bus depending on the desired application and system performance.

Each of the buses 120A–C can be any bus that supports read retry, such as a PCI bus, Accelerated Graphics Port ("AGP"), PCI-X, or the like. In one embodiment of the present invention, each of the buses 120A–C is a PCI bus, and each of the network adaptors 130A–C is a PCI network adaptor that provides a PCI interface for implementing conventional PCI protocols and ordering rule, so that the peripheral devices 110 can communicate with each other using PCI protocols. The PCI network adaptors 130A–C also allow a memory-mapped PCI read or write on one PCI bus to be bridged to another PCI bus in the network 100. In an alternative embodiment, two PCI buses may be coupled to one network adaptor and the network adaptor serves as both a bridge between the two PCI buses and part of a bridge between any of the two PCI buses and a third PCI bus across the network 103.

If a device 110 at any node of the system 100 is a PCI master device, such as a processor, it possesses the ability to address the address spaces of the PCI bus to which the device 110 is directly coupled. There are two distinct PCI address spaces, an input/output ("IO") space and a memory space, associated with each of the PCI buses in the network 100. The memory space associated with a PCI bus may be either x-bytes or $2^x$ locations in size, (where x indicates x-bit addressing). For example, memory space may be either 4 GB or $2^{64}$ locations in size (if 64-bit addressing is utilized). When the network 100 is configured by a conventional configuration program, all of the devices in the network 100 are assigned mutually exclusive address spaces in the address spaces of each of the PCI buses 120 A–C. The computer network 100 can be configured by a processor in one master node, such as node A, or it can be configured independently by more than one processors in different nodes. The configuration program run by any of the nodes automatically detects the presence, type and address space requirements of the devices and allocates space to them by programming their address decoders to recognize the address range it assigns to them.

Figure 2:
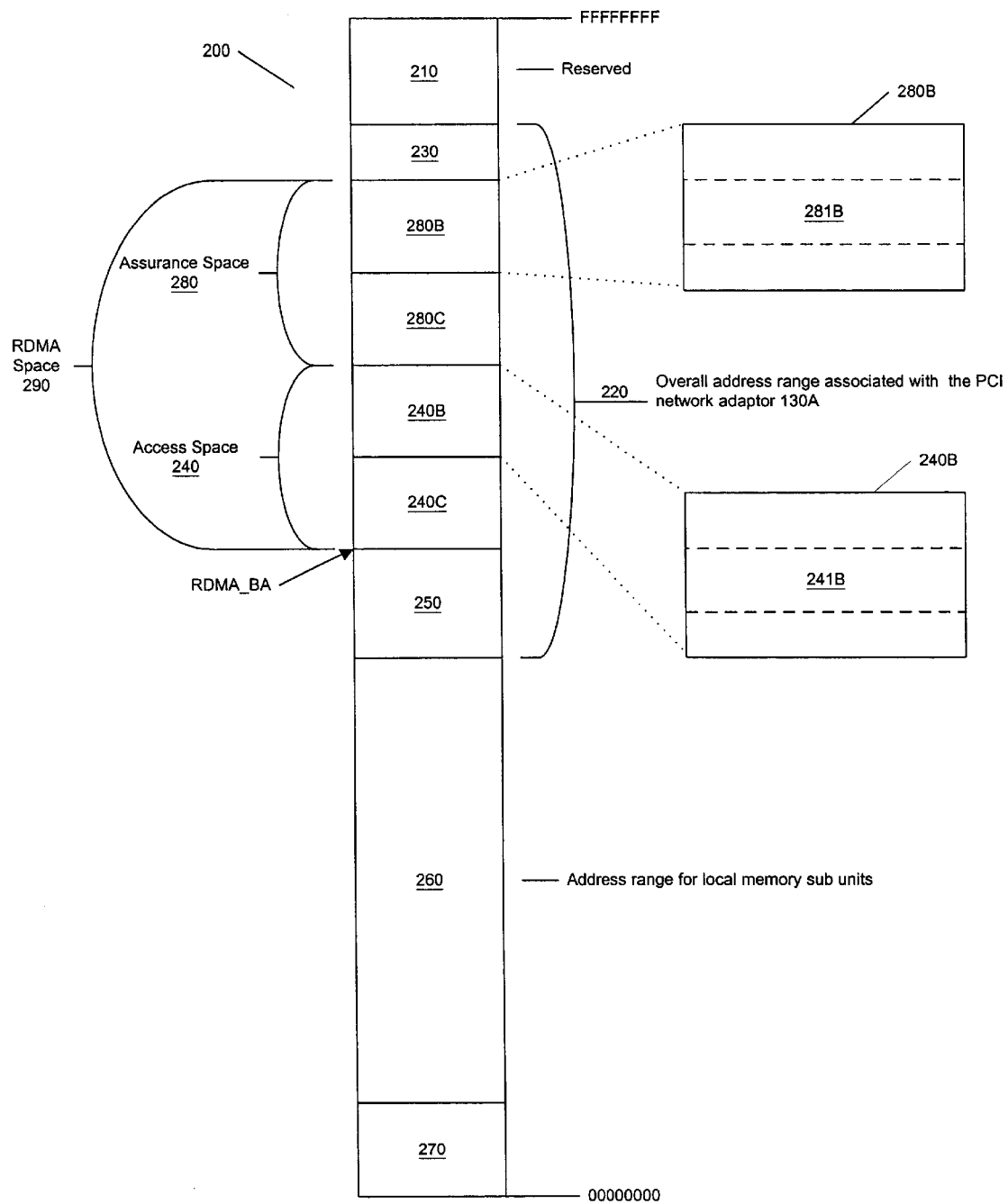
FIG. 2 is a block diagram of a PCI memory space according to one embodiment of the present invention.

To the PCI bus 120A, the devices 111B, 112B, 111C, 112C, and 113C are a community of devices that reside behind the PCI network adaptor 130A. These devices may be memory, IO, or a combination of memory and IO devices. Furthermore, some of the IO devices may be mapped into memory space while others are mapped into IO space. In the memory space of a PCI bus 120A, all memory devices or memory mapped IO devices that reside behind the PCI network adaptor 130A are assigned mutually-exclusive memory address spaces within a common overall range of memory locations associated with the PCI network adaptor 130A. As an example, FIG. 2 is a block diagram showing a memory space 200 of the PCI bus 120A. The memory space 200 includes an overall address range 220 associated with the PCI network adaptor 130A. The address range 220 includes an address space 250 for remote IO operations, and address spaces 290 for RDMA transactions, and a memory mapped register space 230 assigned to internal registers of the PCI network adaptor 130A. The memory space 200 may also include an address space 260 used to access local memory devices or memory sub units at node A, a reserved address range 210, and one or more other address spaces 270.

Still referring to FIG. 2, the RDMA space 290 includes an access space 240 for a device at node A to directly access memory devices over the network router 103, and an assurance space 280 for assurance check operations. The PCI network adaptor 130A is programmed to process any memory transactions detected on the PCI bus 120A as an RDMA transaction if the target address is within the access space 240. The access space 240 includes an address space 240B and an address space 240C corresponding to node B and node C respectively. The address space 240B includes sub spaces that are mapped to the memory devices or memory sub units associated with node B, and the address space 240C includes sub spaces that are mapped to the memory devices or memory sub units associated with node C. The assurance space 280 includes address spaces 280B and 280C. The address space 280B includes sub spaces, each of the sub spaces for obtaining access assurance information regarding an RDMA transaction targeted to a memory device or memory sub units at node B. The address space 280C also includes sub spaces, each of the sub spaces for obtaining access assurance information regarding an RDMA transaction targeted to a memory device or memory sub units at node C. For example, as shown in FIG. 2, the address space 240B includes a sub space 241B which is mapped to device 111B if device 111B is a memory device or to the memory sub units in device 111B if device 111B contains such units. The address space 280B includes a sub space 281B associated with the sub space 241B. An initiator at node A of an RDMA transaction targeted towards device 111B may obtain access assurance information regarding this RDMA transaction by PCI reading from the sub space 281B.

Each of the PCI network adaptors 130A–C in the network 100, such as the PCI network adaptor 130A, includes registers that are used to define the address spaces allocated to devices at other nodes (such as node B and node C) of the network 100. An address space is defined by a base address and an address offset. The base address of an address space serves as a reference point for other addresses in the address space. Any other address within the address space may then be specified by adding an offset to the base address. The largest offset within an address space represents the address offset of the address space. The PCI network adaptor 130A, 130B or 130C typically include registers for the base addresses and address offsets of the following address spaces:

a) memory mapped register spaces (such as address space 230 in FIG. 2);
b) remote IO spaces associated with other nodes of the network 100 (such as address space 250 in FIG. 2);
c) remote direct memory access (RDMA) spaces associated with other nodes of the network 100 (such as the RDMA space 290).

Any access to space b) or c) from a node, such as node A, is processed by a local PCI network adaptor, such as the PCI network adaptor 130A, and transferred to a remote PCI network adaptor, such as the PCI network adaptor 130B or 130C. An access to space c) typically appears at a remote PCI bus as an access to a location in the memory space of the remote PCI bus.

Figure 3:
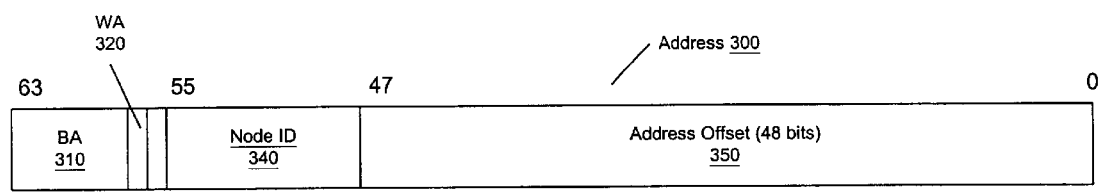
FIG. 3 is a block diagram of a 64-bit PCI read/write address associated with a PCI read/write transaction at a sending node according to one embodiment of the present invention.

A PCI master device at any node of the computer network 100, such as device 111A at node A, may initiate an RDMA transaction by posting a read/write command with a read/write address on the PCI bus 120A. The read/write address may be x-bits, e.g., 64 bits or 32 bits, depending on specific implementation. For example, FIG. 3 illustrates a 64-bit read/write address 300 according to one embodiment of the present invention. The 64-bit read/write address 300 may be segmented into several fields, including a base address ("BA") field 310, a write or read assurance field ("WA") 320, a node ID field 340 and an address offset field 350. The bit assignments for these fields are implementation dependent and are configurable. In one embodiment of the present invention, the BA field 310 includes bits [63:58] and these bits will be compared with the base address of the RDMA space 290, RDMA_BA (as shown in FIG. 2), by the PCI network adaptor 130A. If they match, the PCI network adaptor 130A will recognize that this is an RDMA transaction and asserts a value, DEVSEL#, as per PCI specification. The WA field 320 includes an assurance bit, which in this case is bit 57. This bit is 0 for normal RDMA transactions, and is 1 ("set") for write or read assurance check. The node ID field 340 includes bits [55:48] and are used by the PCI_IF network adaptor to calculate a destination node ID, and a PCI bus number if more than one PCI bus is in the destination node. The bits in the offset field 350 will be used by the remote node to identify the specific device at the remote node as the target of the RDMA transaction.

A write transaction on a local PCI bus, such as PCI bus 120A, is transferred over the network 103 to a remote node, such as node B, as a write request packet including a write address and write data. In response to receiving the write packet, the PCI network adaptor 130B at node B issues a write command, and post the write command on the PCI bus 120B. A read transaction on a local PCI bus, such as PCI bus 120A, is transferred over the network 103 to the remote node (where the desired data resides), such as node B, as a read request packet. In response to receiving the read request packet, the PCI network adaptor 130B at node B issues a read command and returns the requested read data to the PCI network adaptor 130A at node A. While the read transaction is in process, a retry signal is generated at node A to starve off further read requests. Once the requested read data is received at node A, the PCI network adaptor 130A completes the read transaction by returning the read data to the initiator of the read transaction.

When the assurance bit is set on a PCI read command with the PCI network adaptor 130A as the target, it signifies a read access to the assurance space 280 or an assurance check. An initiator of a PCI read/write transaction can perform an access assurance check by posting a PCI read command on the PCI bus 120A with the same address used by the PCI read/write transaction except that the assurance bit is 1 instead of 0. The PCI network adaptor 130A will recognize this read transaction as an assurance check. Once the original PCI read/write transaction completes on the remote node, the PCI network adaptor 130A will process the assurance check to return a value indicating a completion status of the original read/write transaction. In one embodiment of the present invention, the completion status of an RDMA transaction is sent in a response packet during the RDMA transaction and is kept in the PCI network adaptor of the initiating node. If an RDMA completes erroneously before an error check is completed, the error status is kept in the PCI network adaptor indefinitely until an access assurance check comes to clear it.

The PCI network adaptor 130A, 130B or 130C includes functional units for exchanging PCI transactions, e.g. a PCI read/write transaction, from a device coupled to one PCI bus to a device coupled to another PCI bus in the computer network 100. The PCI network adaptor 130A, 130B or 130C also includes functional units for recognizing certain PCI read transactions as assurance check transactions and for processing such a transactions in order to provide PCI read/write assurance information.

Figure 4:
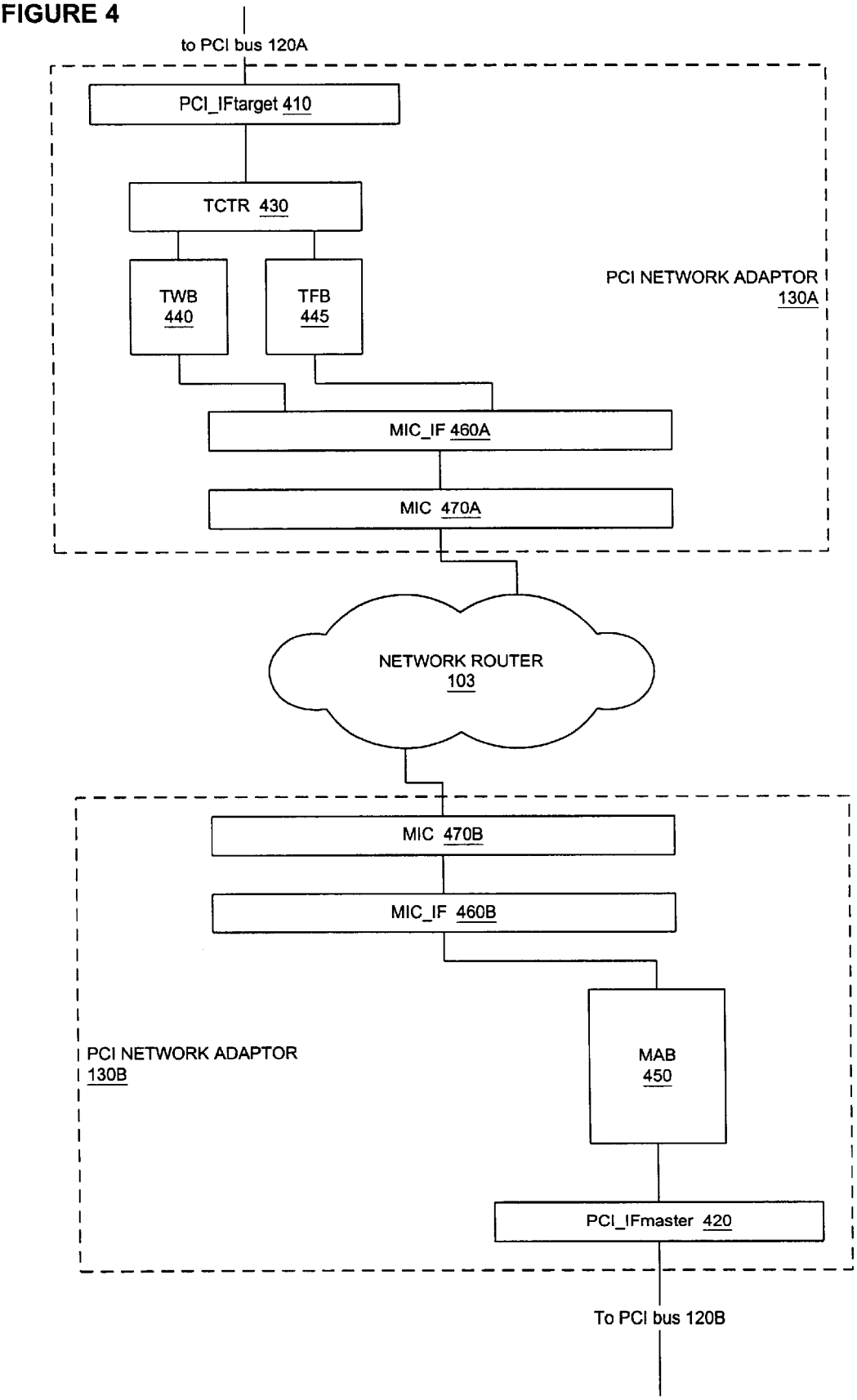
FIG. 4 is a block diagram of part of the functional units included in PCI network adaptors for processing an RDMA transaction according to one embodiment of the present invention.

FIG. 4 illustrates part of the functional units included in the PCI network adaptors 130A and 130B for processing a read/write transaction initiated by a PCI master device at node A, such as device 111, and targeted to a device at node B. As illustrated in FIG. 4, the PCI network adaptor 130A includes a PCI interface ("PCI_IF") target unit 410 coupled to the PCI bus 120A, a target control (TCTR) unit 430 coupled to the PCI_IF unit 410, at least one target write buffer ("TWB") 440 and at least one target fetch buffer ("TFB") 445 coupled to the PCI_IF unit 410. The PCI network adaptor 130A also includes a mesh interface chip ("MIC") unit 470A which on one side is coupled to the TWB 440 and to the TFB 445 through a MIC interface ("MIC_IF") unit 460A, and on the other side is coupled to the network router 103.

As also shown in FIG. 4, the PCI network adaptor 130B includes a PCI_IF master unit 420 coupled to the PCI bus 120B, and a master access buffer ("MAB") unit 450 coupled to the PCI_IF master unit 420. The PCI network adaptor 130B also includes a MIC unit 470B which on one side is coupled to the MAB unit 450 through a MIC interface ("MIC_IF") unit 460A, and on the other side is coupled to the network router 103.

The ("PCI_IF") target unit 410 provides an interface between the PCI bus 120A and the core functions of the PCI network adaptor 130A. It recognizes and receives any PCI transaction posted on the PCI bus 120A and targeted to an address space within the overall address range 220 assigned to the PCI network adaptor 130A. The PCI_IF target unit 410 also calculates a destination node ID based on the target address of the PCI transaction.

When there are more than one TWBs or TFBs, each TWB or TFB is assigned a buffer number. Each of the TWB 440 and TFB 445 includes multiple memory pages. The TCTR unit 430 forms read or write block queues in the memory pages of the TFB(s) or TWB(s), respectively, according to the destination node ID and the address offset in the read/write address. The TCTR includes a tag random access memory (tag RAM) for keeping a record of the read/write block queues, such as the page address of the memory page(s) that queued a particular read/write transaction along with the node ID and address offset associated with the read/write transaction.

The MIC unit 470A provides devices directly coupled to the PCI bus 120A access to the network router 103 by providing an interface between the functional units within the PCI network adaptor 130A and the network router 103.

The MIC interface unit 460A forms a write packet and transfers read/write data packets between the TFB/TWB units 440/445 and the MIC unit 470A. A read or write packet includes a header and a payload. The header includes information such as a source node ID, the destination node ID, type of command, packet length, etc. For a write packet, the payload is the data to be written. For a read packet, the payload is the read data fetched from a remote node.

The MIC unit 470A receives read packets from the network router 103 and sends write packets to the network router 103 with routing information which comes from the destination node ID and a sequence number to keep ordering. For each read packet received from the network router 103, the MIC unit 470A performs a sanity check and error correction, and then sends the read packet to the MIC_IF unit 460A. Examples of the sanity check include a packet corruption check, a packet ordering check, and a detection of duplicated packets.

The network router transmits read/write packets among different nodes of the network 100 based on routing information in each of the read/write packets which identifies a PCI network adaptor as the recipients of that read or write packet.

The MIC unit 470B provides an interface between the functional units within the PCI network adaptor 130B and the network router 103. It receives write packets directed to the PCI network adaptor 130B from the network router 103 and delivers read packets including read data from node B to the network router 103 with routing information indicating the recipient of the read packets. For each write packet received from the network router 103, the MIC unit 470B performs sanity check and error correction, and then sends the write packet to the MIC_IF unit 460B.

The MIC_IF unit 460B forms read packets including read data from node B and transfers read/write data packets between the MIC unit and the MAB unit 450. In response to receiving a write packet, the MIC_IF unit 460B sends a write request including the header of the write packet to the MAB unit 450 and buffers the payload of the write packet into a data buffer in the MAB unit.

The MAB unit 450 processes read/write transactions coming from other nodes (node A and node C) of the network 100. The MAB unit 450 includes a master access data buffer (MAB) with multiple memory pages and processes delivered write requests in the order of arrival. For a write operation, the MAB decodes the header of the write packet and retrieves information such as the source node ID, the destination node ID, the address offset and the type of command, etc. The destination node ID, the address offset and the write data are sent to the PCI_IF master unit 420. For a read operation, the MAB 450 receives read request from the MIC_IF unit 460B and decodes packet information as in the case of write operation. Then the read request is sent to the PCI_IF master unit 420, which obtains the read data by posting the read request on the PCI bus 120B. The read data is sent back to the PCI network adaptor 130A and buffered in the TFB 445.

The PCI_IF master unit 420 translates the address information in a write packet into a PCI address in the PCI memory space of the PCI bus 120B. It also checks for errors that may have happened during the transmission of the write packet. If all is well, the PCI_IF master unit 420 will post the write data with the translated address on the PCI bus 120B, and sends an acknowledgement ("ACK") back in a response packet to the PCI network adaptor 130A, which is where the write packet came from. If errors are found, the error status will be sent back in a response packet to the PCI network adaptor 130A, and the write data will be thrown away. At the PCI network adaptor 130A, the received ACK or completion/error status of an RDMA transaction is kept in the format of error logs, and stored in a random access memory for error logs (error RAM) in the TCTR unit 430. The write completion/error status is kept as TWB_LOG and the read completion/error status is kept as TFB_LOG. The error log in the error ram is indexed by the buffer number of the TFB/TWB that queued the original read/write transaction, respectively.

The PCI master device 111 may initiate an assurance check by posting a read command on the PCI bus 120A. The PCI_IF target unit 410 checks to see if the assurance bit in the read address is set. If it is set, an assurance check is signified, the PCI_IF target unit 410 informs the TCTR unit 430 to look up the tag RAM for the page address of the memory page in the TFB/TWB that queued the original read/write transaction. A buffer number can be derived from the page address and is used to find the assurance information stored in the error RAM. If the page address belongs to a page in the TWB 440, all posted write data in the TWB 440 will be flushed to the remote PCI bus before the read associated with the access assurance check completes on the local PCI bus 120A.

In one embodiment of the present invention, for each assurance check transaction, the PCI network adaptor 130A returns a value indicating the completion status of the RDMA transaction corresponding to the assurance check transaction. The returned value is a 32-bit number that describes whether or not the RDMA has completed with error and/or the error status. The format of the access assurance check status word is shown below,

| 31 | 15 | 7 | 0 |
|---|---|---|---|
| Reserved | TFB | TWB | | where bits[31:16] are reserved, bits[15:8] are error codes corresponding to a read transaction, and bits[7:0] are error codes corresponding to a write transaction. This number is read from the error RAM in the TCTR unit 430.

The embodiments of the present invention as described above enable a processor in a computer network to remotely access memory addresses of another device of the computer network, and to obtain access assurance information about the remote access. The access assurance information is recorded at a node local to the initiating device and can be obtained by PCI reading from a certain address range in a local PCI memory space. There is no need to access the remote memory addresses over the network again in order to make sure that the first access was done properly, and therefore, the embodiments of the present invention makes more efficient use of the network bandwidth.

We claim:

1. A method for a first computer device to obtain access assurance information regarding a remote direct memory access transaction directed to a second computer device over a computer network, the first computer device being coupled to a bus, and a network adaptor being coupled between the bus and the computer network, the method comprising:

providing an access space within a memory space of the bus, the access space storing a first range of addresses associated with the network adaptor, and the network adaptor configured to process a transaction having a target address within the first range of addresses as the remote direct memory access transaction directed to the second computer device over the computer network;

providing an assurance space within the memory space of the bus, the assurance space storing a second range of addresses associated with the network adaptor; and reading from the assurance space, the network adaptor configured to return the access assurance information regarding the remote direct memory access transaction to the first computer device in response to reading from the assurance space.

2. The method of claim 1, wherein the access assurance information is received by the network adaptor in a response packet associated with the remote direct memory access transaction and is stored in the network adaptor.

3. The method of claim 2 wherein the access assurance information is stored in the network adaptor until the first computer device performs an assurance check to obtain the access assurance information.

4. The method of claim 1, wherein the target address includes a node identification field, an assurance field, and an address offset, and reading from the assurance space comprises:

posting a read command on the bus with a read address including a same node identification field and a same address offset as those of the target address but a different assurance field from that of the target address.

5. A system for enabling a first device to obtain access assurance information regarding a remote direct memory access transaction directed to a second device over a computer network, comprising:

a first PCI bus coupled to the first device, the first PCI bus including an access space and an assurance space; and a first PCI network adaptor coupled between the first PCI bus and the computer network, the access space storing a first range of addresses associated with the first PCI network adaptor, the first PCI network adaptor being configured to process a transaction having a target address within the first range of addresses as the remote direct memory access transaction and to receive the access assurance information corresponding to the remote direct memory transaction over the computer network, the assurance space storing a second range of addresses associated with the first PCI network adaptor, and the first PCI network adaptor configured to return the access assurance information to the first device in response to reading from the assurance space.

6. The system of claim 5, wherein the first PCI network adaptor comprises:

a PCI interface target unit coupled to the first PCI bus, and configured to recognize and receive the remote direct memory access transaction in response to a determination that the target address is within the first range of addresses at least one buffer; and a PCI target control unit coupled between the PCI interface target unit and the at least one buffer, and configured to form at least one block queue of data associated with the remote direct memory access transaction in the at least one buffer.

7. The system of claim 6, wherein the PCI target control unit comprises a first memory unit configured to store a memory location of the queued data associated with the remote direct memory access transaction in the at least one buffer, and a second memory unit configured to store the access assurance information corresponding to the remote direct memory access transaction.

8. The system of claim 7, wherein the access assurance information in the second memory unit is indexed by the memory location of the queued data associated with the remote direct memory access transaction.

9. The system of claim 7, further comprising:

a second PCI bus coupled to the second device; and a second PCI network adaptor coupled between the second PCI bus and the computer network, and configured to process the remote direct memory access transaction, to determine the access assurance information corresponding to the remote direct memory access transaction, and to send the access assurance information to the first PCI network adaptor over the computer network.

10. The system of claim 9, wherein the second PCI network adaptor comprises:

a master access buffer configured to determine address information associated with the remote direct memory access transaction; and a PCI interface master unit coupled between the master access buffer and the second PCI bus, and configured to translate the address information into a PCI address and to post the remote direct memory access transaction on the second PCI bus with the PCI address.

11. The system of claim 10, wherein the PCI interface master unit determines the access assurance information corresponding to the remote direct memory access transaction, forms a response packet including the access assurance information, and sends the response packet to the first PCI network adaptor over the computer network according to the address information.

12. The system of claim 5, wherein the remote direct memory access transaction comprises a write transaction.

13. A system for enabling a first device to obtain access assurance information corresponding to a remote direct memory access transaction directed to second device over a computer network, comprising:

a bus coupled to the first device, the bus including an access space and an assurance space;

a network adaptor coupled between the bus and the computer network for coupling the first device to the computer network, the access space storing a first range of addresses associated with the network adaptor, the network adaptor being configured to process a transaction having a target address within the first range of addresses as the remote direct memory access transaction and to receive the access assurance information corresponding to the remote direct memory transaction over the computer network, the assurance space storing a second range of addresses associated with the network adaptor, and the network adaptor configured to return the access assurance information to the first device in response to reading from the assurance space, the network adaptor comprising, an interfacing means for recognizing and receiving the remote direct memory access transaction in response to a determination that an address associated with the remote direct memory access transaction is within the first range of addresses;

at least one buffer for queuing data associated with the remote direct memory access transaction; and a controlling means coupled with the interfacing means for forming block queues of the data associated with the remote direct memory access transaction in the at least one buffer; and a memory coupled with the controlling means, for storing the access assurance information received from the computer network.

* * * * *

UNITED STATES PATENT AND TRADEMARK OFFICE
CERTIFICATE OF CORRECTION

PATENT NO.   : 6,804,673 B2
DATED        : October 12, 2004
INVENTOR(S)  : Hirohide Sugahara, Jeffrey D. Larson, Takashi Miyoshi and Takeshi Horie It is certified that error appears in the above-identified patent and that said Letters Patent is hereby corrected as shown below:

Column 9,
Line 49, please delete "claim 7" and insert -- claim 5 --.

Signed and Sealed this

Twenty-eighth Day of December, 2004

JON W. DUDAS
*Director of the United States Patent and Trademark Office*